United States Patent [19]

Akira et al.

[11] Patent Number: 4,973,462

[45] Date of Patent: Nov. 27, 1990

[54] PROCESS FOR PRODUCING HIGH PURITY SILICA

[75] Inventors: Seki Akira; Yuuki Narita; Shunroh Nagata, all of Tokyo, Japan

[73] Assignee: Kawatetsu Mining Company, Ltd., Tokyo, Japan

[21] Appl. No.: 433,447

[22] Filed: Nov. 9, 1989

Related U.S. Application Data

[63] Continuation of Ser. No. 242,315, Sep. 9, 1988, abandoned.

[51] Int. Cl.$^5$ .............................................. C01B 33/12
[52] U.S. Cl. ..................................... 423/339; 423/338
[58] Field of Search ................................. 423/338, 339

[56] References Cited

U.S. PATENT DOCUMENTS

| | | | |
|---|---|---|---|
| 4,067,746 | 1/1978 | Wason et al. | 423/339 |
| 4,190,632 | 2/1980 | Achenbach et al. | 423/339 |
| 4,321,243 | 3/1982 | Cornwell et al. | 423/335 |
| 4,465,657 | 8/1984 | Spijker et al. | 423/339 |
| 4,505,883 | 3/1985 | Vite et al. | 423/335 |
| 4,683,128 | 7/1987 | Orii et al. | 423/339 |

OTHER PUBLICATIONS

Bunseki '88 9, Japan Society for Analytical Chemistry, pp. 639–646, Sep. 1988 (partial translation).

*Primary Examiner*—Jeffrey E. Russel
*Assistant Examiner*—Lori F. Cuomo
*Attorney, Agent, or Firm*—Sherman and Shalloway

[57] ABSTRACT

This invention concerns a process for producing high purity silica with less than 5 ppm of impurities from cheap alkali silicate aqueous solution (water glass) for industrial use, which commonly contains more than 2000 ppm of impurities, by directly adding water glass to a mineral acid solution, such as hydrochloric acid, nitric acid, and sulfuric acid so as to dissolve impurities in the mineral acid solution and form silica precipitate, and then rinsing the silica precipitate with a mineral acid solution, provided that the viscosity of the water glass is adjusted to 10–10000 poise in advance of adding to the mineral acid solution.

7 Claims, No Drawings

PROCESS FOR PRODUCING HIGH PURITY SILICA

This application is a continuation of application Ser. No. 242,315 filed Sept. 9, 1988, now abandoned.

FIELD OF THE INVENTION

This invention relates to a process for producing high purity silica from alkali silicate aqueous solution. More particularly, it relates to a process for producing high purity silica from cheap water glass for industrial use, which commonly contains more than 2000 ppm of impurities in total, by effectively removing metals, such as Al, Fe, and Ti, alkali metals, such as Na, or radioactive elements, such as U.

PRIOR ART

Recently, the demand for silica used as functional, optical, or electronic materials has been increasing so rapidly that it is becoming more and more difficult to use natural silica as it is, in view of the purity, shape, or property it is required to have for its individual use. Especially, for use in plastic fillers for IC sealants, such low radioactive, high purity silica is required that artificial silica is produced by various processes in order to meet the increasing demand.

In the meantime, when high purity silica is desired, there have so far been employed such processes as follows.

(1) Most general process so far used: chemical treatment, melting and pulverization process of high purity natural silica or quartz containing less radioactive elements, such as U or Th (2) Process of causing deliberately purified silicon tetrachloride to react with oxygen in the oxy-hydrogen flame or process of hydrolyzing and then sintering silicate alkoxides, such as tetraethylsilicate.

(3) Process of treating an alkali silicate aqueous solution with an ion-exchange resin and then removing impurities before collecting silica (4) Process of rinsing silica, produced from the reaction of an alkali silicate aqueous solution and a mineral acid solution which contains a chelating agent and hydrogen peroxide, with a mineral acid solution which contains a chelating agent and hydrogen peroxide (Japanese patent application laid-open publication sho No. 62-12608)

These processes are all designed to produce high purity silica. Despite that, silica produced by the process (1) contains about 30 ppm of Al, 2 ppm of Fe, 3 ppm of Ti, 3 ppm of Na, 1 ppm of K, and 1–10 ppb of U; hence, it does not fit at all for plastic fillers for IC sealants used in an integrated circuit of 256 kilobits and above.

On the contrary, silica produced by the process (2) is certainly of very high purity since purified raw material is used. But the material itself is so expensive that in fact the silica cannot be put to general use, except for some limited special purposes.

In the case of the process (3), the $SiO_2$ content in alkali silicate aqueous solution has to be reduced to less than 10 percent by weight in advance of purification; thus, the production efficiency becomes very low, in terms of the apparatus to be used therefor. Moreover, because the silica-precipitating operation is complex and the refreshing process of ion-exchange resin has trouble in itself, this process has problems in productivity.

According to the process (4), JIS-standardized No. 3 alkali silicate aqueous solution, which contains as high as 28.5 percent by weight of $SiO_2$, is used; however, it has to be added to a mineral acid solution slowly in order to precipitate silica. What is more, the silica precipitate has to be kept standing at 80° C. for as long as 2 hours for ageing, because this is indispensable for dissolved silica in the mineral acid solution to fully precipitate. Furthermore, after being filtered out, silica has to be rinsed in acid at 90° C. for as long as 3 hours to remove impurities.

As apparent from the above, as long as conventional processes are employed, there are always problems. Generally speaking, when it comes to a high purity product, mostly there have been proposed many production processes for that product in relation to the purity of its material. However, as far as the production process of silica is concerned, there is no disclosure that can be said to have fully solved these conventional problems.

SUMMARY OF THE INVENTION

Under the circumstances, the present inventors made intensive studies to eliminate conventional problems in the production process of silica and finally accomplished this invention by finding a process for producing high purity silica very simply from a cheap alkali silicate aqueous solution for industrial use. That is, according to this invention, an alkali silicate aqueous solution available on the market as water glass, of which the $SiO_2/Na_2O$ molar ratio is in the range 1–4, can be used as material raw. Moreover, silica can be precipitated by directly adding the material to a mineral acid solution, such as hydrochloric acid, nitric acid, and sulfuric acid, wherein the mineral acid solution can be used singly or in combination with one another.

Incidentally, a great feature of this invention is in rapidly forming silica precipitate while dissolving impurities in the mineral acid solution, by previously adjusting the viscosity of the alkali silicate aqueous solution in such a way that silica may not disperse and dissolve in the mineral acid. In order that this invention may be more clearly understood, reference will now be made to the production process of silica according to this invention, which essentially comprises the following two sub-processes.

(1) Viscosity adjustment of an alkali silicate aqueous solution

Generally, the neutralization reaction of an alkali silicate aqueous solution and a mineral acid solution gives rise to silica precipitate. When the acidity of the mineral acid solution is strong, silica does not almost precipitate because it dissolves in the solution. This phenomenon is remarkable, especially when the $SiO_2$ content in the alkali aqueous solution is less than about 10 percent by weight. However, the dissolution of silica in the mineral acid solution becomes slow with the increase of the viscosity or the increase of $SiO_2$ content in the alkali silicate aqueous solution.

An alkali silicate aqueous solution available on the market commonly contains about 30 percent by weight of $SiO_2$ and has a viscosity of about 5 poise. If the alkali silicate aqueous solution is put in a mineral acid solution as it is, almost all of it dissolves in the solution. However, the present inventor has come up with the fact that those having a viscosity of 10 poise and above liberate alkali metal and impurities, and allow only silica to precipitate in a mineral acid solution, almost in a moment from a few seconds to a few minutes after both are mixed, whereas those having a viscosity of 10000 poise and above liberate alkali metal in a mineral acid solution but cause other metal impurities to mingle with silica precipitate. For this reason, an alkali silicate aqueous solution whose viscosity has been adjusted in such a way as to promote the neutralization reaction and liberate impurities issued. Accordingly, the viscosity of an alkali silicate aqueous solution is in the range 10–10000 poise, and more preferably is in the range 10–3000 poise.

In order to increase its viscosity, an alkali silicate aqueous solution is made to polymerize or is allowed to contain an organic polymer according to this invention. As for the polymerization, the partial polymerization process by means of acid substance, the dehydration-condensation process, or the polyvalent metal addition process can be employed, for example. But, in view of the production of high purity silica, it is disadvantageous to add a substance that later makes impurity, whichever the substance may be organic or inorganic. Moreover, the simpler the process is the more advantageous it is for commercialization. Thus, the dehydration condensation process is considered the best of all in this case. In the meantime, the viscosity of an alkali silicate aqueous solution characteristically increases with the removal of a few percent of water therefrom; therefore, evaporation by either heating, evacuating, or microwave heating may be applied to the dehydration-condensation process.

(2) Production of high purity silica

An alkali silicate aqueous solution whose viscosity has been appropriately adjusted in accordance with the above is added to a mineral acid solution whose normality is adjusted to 1 or more in order that out of the silicate solution, alkali metal and other metal impurities may dissolve in the mineral acid solution and silica may precipitate through gelation reaction. The rate of adding an alkali silicate aqueous solution to a mineral acid solution is not entirely limited; that is, the former can be mixed in the latter in a short period of time, from a few seconds to a few minutes, for example. If, however, an alkali silicate aqueous solution is used as it is, without previously adjusting its viscosity, almost all silicate dissolves in a mineral acid solution, with the result that the production yield of silica becomes extremely low. Thus, if silica is desired to precipitate without adjusting the viscosity of an alkali silicate aqueous solution, heating and ageing the solution mixture for a long time become necessary. Also, silica precipitate thus produced contains so much water that the content of impurities involved in the silica with water inevitably increases as much. As a result, the silica has to be rinsed with acid more thoroughly in the next process in order to remove such impurities. Considering these unnecessary operations to be made later, it will become apparent what an important role the viscosity adjustment plays in this invention.

Among mineral acids to be used in association with an alkali silicate aqueous solution are hydrochloric acid, nitric acid, sulfuric acid, and the like; they can be used singly or in combination with one another. In addition to these, spent mineral acid solution after the next acid-rinsing process can also be recycled in the same way as a fresh mineral acid solution. Nonetheless, a considering the reactor material to withstand the acid action or the cost thereof, it is desirable to use sulfuric acid or nitric acid.

It is certainly effective to add a chelating agent, such as EDTA, commonly used for the chemical analysis, to stabilize metal impurities in the mineral acid solution, or add hydrogen peroxide, commonly used for Ti chemical analysis, to fully remove Ti in the mineral acid, but they have not so much importance in this invention. In terms of reaction kinetics, the higher the reaction temperature, the more effectively the silica production can be carried out, as a matter of course. According to this invention, however, there is particularly no need of restricting the reaction temperature.

After having been filtered out, silica precipitate is simply rinsed with water, filtered out, and then transferred to the next acid-rinsing process, where the silica precipitate is rinsed in acid solution with stirring, wherein the word acid is meant to specify inorganic acids, such as hydrochloric acid, nitric acid, and sulfuric acid, and organic acids, such as formic acid. Nonetheless, virtually, it is desirable to use sulfuric acid or nitric acid in the acid-rinsing process. And, the acid concentration is preferably not less than 0.5 normal, while the rinsing temperature and duration are not so significant factors.

High purity silica, as it contains water, is produced after the acid-rinsing process, which is followed by filtration, simple water-rinsing and filtration. The acid-rinsing process may be carried out more than once, if necessary. The silica is dried, and then sintered at 1100° C. in such a way as to fully remove water, before being collected as product.

EXAMPLE 1

In order to remove water, 3330 g of JIS-standardized No. 3 water glass available on the market, which contains 29.5 percent by weight of $SiO_2$ and 9.8 percent by weight of $Na_2O$, is heated at 100° C. for about 3 hours; as a result, it weighs 3100 g. The $Si_2O$ content in the water glass is 32 percent by weight; the solution viscosity of the water glass is about 100 poise at 30° C.

The water glass solution is added to 10 l of 21.7 % (by weight) nitric acid aqueous solution containing 50 g of 35% (by weight) hydrogen peroxide, extending over about 1 minute. Then, there appears silica precipitate.

After being filtered out, the silica precipitate is rinsed twice with about 10 l of pure water and then filtered out. It is put in 5 l of 32.5% (by weight) nitric acid aqueous solution containing 1.5 g of EDTA, and 30 g of 35% (by weight) hydrogen peroxide, heated at 70° C. for 1 hour with stirring, and filtered out. It is further rinsed twice with about 5 l of pure water, dried, and sintered at 1100° C. for 2 hours. As a result, it gives 950 g of high purity silica. Impurities contained in the silica are shown in Table 1, together with those in the raw water glass.

EXAMPLE 2

Raw water glass, the viscosity of which is adjusted in the same way as in Example 1 is added to 7 l of 16.3% (by weight) sulfuric acid aqueous solution containing 50 g of 35 % (by weight) hydrogen peroxide, extending over 1 minute. The solution mixture is stirred at 50° C. for 20 minutes. Then, there appears silica precipitate.

After filtered out, the silica precipitate is rinsed twice with about 10 l of pure water and then filtered out. It is put in 3 l of 24.5% (by weight) sulfuric acid aqueous solution containing 1.5 g of EDTA and 30 g of 35% (by weight) hydrogen peroxide, stirred at 70° C. for 1 hour, and filtered out. It is further rinsed twice with about 5 l of pure water, dried, and sintered at 1100° C. for 2 hours. As a result, it gives 960 g of high purity silica.

Impurities contained in the silica are shown in Table 1.

COMPARATIVE EXAMPLE 1

Without previously adjusting the viscosity of the water glass, silica is produced in the same way as in Example 1. As a result, 700 g of silica is obtained. Impurities contained in the silica are shown in Table 1.

As apparent from the above, according to this invention, it is possible to economically produce high purity silica with less than 5 ppm of total impurities from cheap water glass available on the market in a short period of time by means of very simple operations. Additionally, silica thus produced is so pure that it can be used in various industrial fields, such as optics, electronics, and chemical reactions needing high functional catalysers, as well as serving as a material for the production of cheap and high purity quartz glass. Like this, considering the fact that natural, high purity silica has been running short these days, the significance of this invention enabling us to supply plentiful high purity silica is very great.

COMPARATIVE EXAMPLE 2

3330 g of water glass available is added to sulfuric acid aqueous solution ($H_2SO_4$ contents 16.3 weight %) containing 1.5 g of EDTA and 50 g of 35% (by Weight) hydrogen peroxide without previously adjusting the viscosity of the waterglass. Then there appears silica precipitate after aging at about 80° C. for 2 hours.

After filtered out, the silica precipitate is rinsed twice with about 10 l of pure water and then filtered out. It is put in 3 l of 24.5% (by weight) sulfuric acid aqueous solution containing 1.5 g of EDTA and 30 g of 35% (by weight) hydrogen peroxide, stirred at 70° C. for 1 hour, and filtered out. It is further rinsed twice with about 5 l of pure water, dried, and sintered at 1100° C. for 2 hours. As a result, it gives 800 g of purity silica.

Impurities contained in the silica are shown in Table 1.

TABLE 1

| | | in Produced Silica | | | |
|---|---|---|---|---|---|
| Impurities | in Raw Water Glass | Ex. 1 | Ex. 2 | Comp. Ex. 1 | Comp. Ex. 2 |
| Al (ppm) | 1100 | 1.1 | 1.6 | 3.0 | 4.0 |
| Fe (ppm) | 130 | 0.2 | 0.3 | 3.0 | 2.0 |
| Ti (ppm) | 160 | 0.5 | 0.3 | 2.0 | 1.0 |
| K (ppm) | 100 | <0.1 | <0.1 | 0.4 | 0.4 |
| Na (ppm) | * | <1.0 | <1.0 | 6.3 | 9.0 |
| Ca (ppm) | 100 | <0.1 | <0.1 | 0.7 | 0.8 |
| Mg (ppm) | 100 | <0.1 | <0.1 | 0.1 | 0.1 |
| U (ppb) | 102 | <0.1 | <0.1 | 0.7 | 0.5 |
| Th (ppb) | 220 | <0.1 | <0.1 | 0.9 | 0.8 |
| $SiO_2$ Yield (%) | — | 95 | 96 | 70 | 80 |

*The quantity of impurities in raw water glass is calculated, given that $SiO_2$ is 100 percent by weight, except $Na_2O$.

What is claimed is:

1. A process for producing high purity silica from an alkali silicate aqueous solution which comprises adding an alkali silicate aqueous solution having a viscosity of from 10 to 10,000 poise to a mineral acid solution to thereby cause silica particles to precipitate in said mineral acid solution and simultaneously causing impurities in the alkali silicate aqueous solution to dissolve in said mineral acid solution, rinsing the precipitated silica particles with an acid solution at an acid concentration of not less than 0.5 normal, wherein said acid solution used for said rinsing includes at least one of a chelating agent and hydrogen peroxide to assist in dissolving said impurities remaining with the precipitated silica particles, whereby there is obtained high purity silica particles containing not more than 5 ppm impurities, in total, including less than 0.1 ppb uranium.

2. The process of claim 1 which further comprises an intermediate step of rinsing the precipitated silica particles with water prior to said step of rinsing with an acid solution.

3. A process for producing high purity silica from an alkali silicate aqueous solution which comprises adding an alkali silicate aqueous solution having a viscosity of from 10 to 10,000 poise into a mineral acid solution, wherein said mineral acid solution further comprises at least one of a chelating agent and hydrogen peroxide to assist in dissolving impurities in the alkali silicate aqueous solution in the mineral acid solution, to thereby cause silica particles to precipitate in said mineral acid solution and simultaneously causing impurities in the alkali silicate aqueous solution to dissolve in said mineral acid solution to such an extent that there is obtained high purity silica particles containing not more than 5 ppm impurities, in total, including less than 0.1 ppb uranium.

4. The process of claim 3, wherein the mineral acid solution has a normality of 1 or more.

5. The process of claim 3, wherein the mineral acid solution comprises nitric acid or sulfuric acid.

6. A process for producing high purity silica particles containing not more than 5 ppm in total of impurities, including less than 0.1 ppb uranium, from an alkali silicate aqueous solution, said process comprising adding alkali silicate aqueous solution having a viscosity of from 10 to 3,000 poise into a nitric acid or sulfuric acid solution of at least 1 normal, said acid solution further comprising at least one of a chelating agent and hydrogen peroxide to thereby cause silica particles to precipitate in said acid solution without any substantial amount of silica dissolving in said acid solution, and further causing impurities in said alkali silicate aqueous solution to dissolve in said acid solution, recovering said precipitated silica particles substantially free of said impurities, washing said recovered silica particles at least once with water, and rinsing said water washed silica particles at least once with an acid solution of at least 0.5 normal and containing at least one of a chelating agent and hydrogen peroxide, whereby there is obtained high purity silica particles containing not more than 5 parts per million, in total, of impurities, including less than 0.1 part per billion of uranium.

7. The process of claim 6 wherein each of said chelating agent and hydrogen peroxide are used at least once.

* * * * *